Patented June 25, 1929.

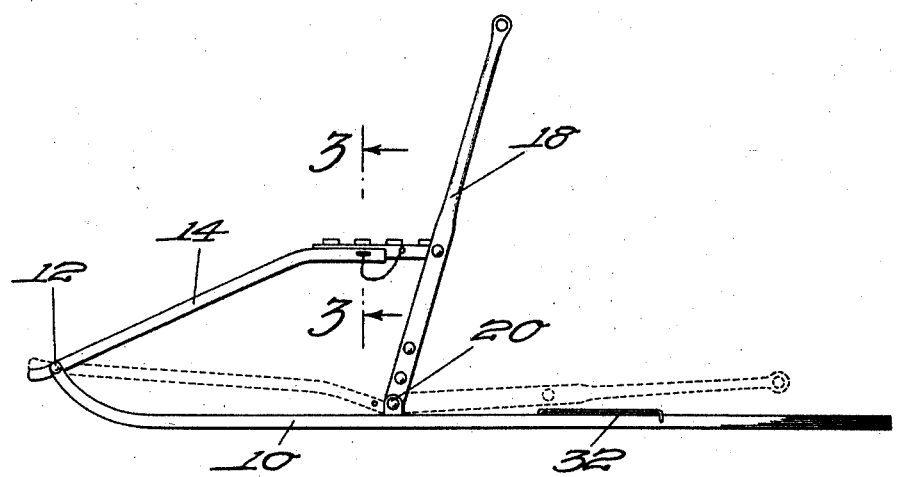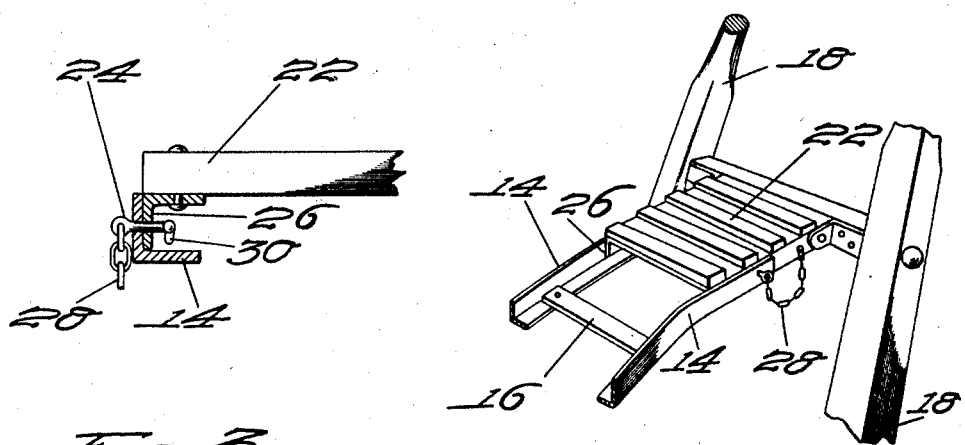

1,718,787

UNITED STATES PATENT OFFICE.

THORLEIF B. JORGENSEN, OF CHICAGO, ILLINOIS.

SLED.

Application filed September 22, 1926. Serial No. 136,944.

This invention relates to improvements in sleds and has for one of its principal objects the provision of a sled or similar vehicle which will accommodate a passenger and also an operator and allowing the operator the free use of at least one of his limbs for the purpose of propelling the sled when necessary.

One of the important objects in this invention is to provide a sled which may be used for coasting purposes and the like and which at the same time is adapted for folding into a small space to occupy a minimum amount of room when not in use and also when in storage or for shipping or transportation purposes.

Other and further important objects of this invention will be apparent from the disclosures in the accompanying drawings and following specification.

The invention, in a preferred form, is illustrated in the drawings and hereinafter more fully described.

In the drawings:

Figure 1 is a side elevation of the improved sled of this invention showing folded position thereof in dotted lines.

Figure 2 is a detail perspective view of the seat of the sled illustrating the folding arrangement.

Figure 3 is a detail view partly in section showing the connection between the seat and its supporting brace.

Figure 4 is a top plan view of the locking pin used in the seat and brace connection.

As shown in the drawings:

The reference numeral 10 indicates the sled runners preferably formed of strips of iron or similar metal. These runners are bent upwardly in front in the usual manner and at their ends 12 and pivotally attached thereto, and seat supporting brackets 14 which are composed of angle irons as shown in Figure 3. At their upper ends these seat supporting brackets are joined by a transverse brace 16.

A pair of operating or propelling handles 18 are mounted on the sled runners being pivotally attached thereto at 20 and to these operating handles is pivotally affixed a seat 22 formed of any convenient or desired material and which may be of any shape. The forward portion of the seat is designed to drop into the angular ends of the seat supporting elements 14 and is locked in this position by means of locking pins 24 extending through suitable openings formed in the members 14 and the seat supports 26. These pins 24 are attached to the seat itself by means of chains or the like 28, to eliminate possibility of loss and preferably a locking element for the pins is provided in the form of a drop end 30 pivotally mounted on the inner end of the pin as shown in Figures 3 and 4.

When the sled is folded as shown by the dotted lines in Figure 1 the propelling handles 18 are normally held against the runners 10 by means of the arm of the operator, and in this position the seat braces 14 are likely to swing outwardly if the sled is tilted to any angle from the vertical. In order to prevent this the pins 24 on the chains 28 are passed into the openings in the ends of the members 14, the chains being of a sufficient length to accomplish this result, thereby preventing any undesired outward swinging of the members 14.

A foot rest for the operator is provided on the runner 10 as shown at 32. It will be seen that herein is provided a sled which in addition to possessing the advantages of ordinary sleds now on the market, can be readily folded into a small compass when desired and with a minimum expenditure of time and trouble. Further, the folding connections are such that there will be no possibility of collapse of the sled when in use and the parts are all convenient and simple of operation.

I am aware that many changes may be made and numerous details of construction varied throughout a wide range without departing from the principles of this invention, and I therefore do not purpose limiting the patent granted hereon otherwise than as necessitated by the prior art.

I claim as my invention:

1. A sled comprising a pair of runners, a pair of joined handles pivotally mounted on the runners adjacent the middles thereof, a seat pivotally mounted in the handle structure, seat supporting brackets extending from the seat to the forward ends of the runners, and removable connections between said seat supporting brackets comprising angle irons, means joining said angle irons adjacent the side and providing receiving means for the seat at the ends of the longer angles, and removable connections between the seat and the runners.

2. A sled comprising runners and a handle structure, a seat pivotally mounted on the handle structure, seat supporting brackets pivotally mounted on the runners and means for removably attaching the seat to the brackets, the said seat supporting brackets comprising angle irons, the ends of same being adapted for the reception of the seat.

In testimony whereof I affix my signature.

THORLEIF B. JORGENSEN.